United States Patent [19]
Fine et al.

[11] 3,738,530
[45] June 12, 1973

[54] SEEDER DEVICE

[76] Inventors: Hyman M. Fine, 245 Smith Street; James L. McKearney, 10 Reynolds Street, both of Attleboro, Mass. 02703

[22] Filed: July 26, 1971

[21] Appl. No.: 165,932

[52] U.S. Cl. .................................... 221/211, 111/1
[51] Int. Cl. ............................................ A01c 5/00
[58] Field of Search .................. 221/185, 211, 312; 111/1; 73/425.6; 222/74, 335

[56] References Cited
UNITED STATES PATENTS

| | | | |
|---|---|---|---|
| 3,627,173 | 12/1971 | Kerker | 221/211 |
| 2,546,838 | 3/1951 | Tasche | 221/211 X |
| 3,240,175 | 3/1966 | Clow | 221/211 X |
| 3,261,208 | 7/1966 | Fisher | 73/425.6 |

Primary Examiner—M. Henson Wood, Jr.
Assistant Examiner—Michael Mar
Attorney—Herbert W. Kenway, Melvin R. Jenney, Townsend M. Gunn et al.

[57] ABSTRACT

A device for planting seeds in an orderly array which has a plurality of suction needles adapted to be positioned over a seed-carrying tray, an air supply for first pulling air through the needles to removably attach a seed to the end of each needle and then blowing air through the needles to expel seeds, transfer means for separating the needles from the tray so that the needles will be in a position where discharge of the seeds from the end of the needles will cause them to fall in an ordered array on an area to be seeded, additional means for making sure the seeds do not stick to the ends of the needles, and valve means for changing the flow of air through said needles.

10 Claims, 5 Drawing Figures

INVENTORS
HYMAN M. FINE
JAMES L. McKEARNEY
BY
Kenway, Jenney & Hildreth
ATTORNEYS

PATENTED JUN 12 1973

INVENTORS
HYMAN M. FINE
JAMES L. McKEARNEY

BY Kenway, Jenney & Hildreth

ATTORNEYS

SEEDER DEVICE

BACKGROUND OF THE INVENTION

In the flower growing industry, where many thousands of flowers are grown for the various special seasons of the year such as Easter, Christmas, Memorial Day, etc., as well as during the rest of the year, in order to have flowers in bloom, for example, on Easter day, the seeds must be planted and kept at proper temperature as early as January of the year. In most of the planting operations today, so called flats are used which are shallow boxes about a foot and a half on the side. These are filled with dirt, and then the seeds are strewn by hand over the flat, preferably in rows, but nevertheless there is little or no attempt to separate the seeds. When the seeds have germinated and grown to about 2 inches high (for example), the bunched seedlings are manually separated so that each seedling (or possibly two or three) can then be transplanted into another flat or possibly a field. Thus, when the flowers mature, there will be one or two flower stalks per bunch.

The manual labor is very expensive to carry out the above operations. For example, planting 50,000 petunias by this method requires four laborers working at least 1 month. Labor is expensive.

Another drawback is that in order to prepare, for example, a hundred thousand petunias for the Easter season, they must be planted in January and then transplanted starting the first of February. Between planting in the flats originally and transplanting in February and later months, one must work steadily starting in January of a given year right up to the Easter period. Again, this requires months of expensive labor.

Another and better way of doing this is not to use the flats, but to use what are termed packs (a shallow box about 5 inches wide, 7 inches long, and 2 inches deep filled with soil). In this case, attempts have been made to plant the individual flower seeds in an orderly array in the pack. Perhaps only one seed is planted at each spot in the pack, but in some cases possibly two or three seeds may be needed to be planted at each location.

Obviously, if such packs are to be seeded by hand, again the labor cost becomes very high. As a result, during the last several years attempts have been made to develop machinery which will automatically do the planting in packs in accordance with a predetermined array and number of seeds per location. Such machinery has at best been only moderately successful, due to difficulties in handling the small seeds, jamming of the pick-up devices by the seeds, failure of the device to properly discharge the seeds, and so forth.

Part of the problem of planting seeds arises from the size and value of the seeds themselves. Many flower seeds cost up to $12,000 or more per pound, and in a pound thereof there may be as many as 250,000 individual seeds which are very small and light. If the machine is not virtually foolproof and operates improperly, the seeds may become spilled or blow away, and resulting loss being extremely costly to the flower grower. The extent of the market for flowers is given from the above, and particularly when it is realized that a given horticulturist may grow for the market up to a million petunias, just to name one flower. He may also plant thousands or more of each of several different varieties of flowers. The size of this kind of operation indicates how important it is to eliminate part of the high labor cost presently encountered.

There is a machine on the market using suction needles which are placed over a tray holding the seeds to pick up seeds. The needles and seeds are then moved to a position over a pack, and the flow of air is reversed to discharge the seeds. The present invention concerns itself with improvements on such machines in order to provide a planting device in which the proper pick-up of seeds and subsequent discharge, are more certain. Furthermore, it is possible with the machine of this invention to have a better control over the quantity of seeds that will be planted in one spot in or on the pack.

SUMMARY OF THE INVENTION

Accordingly, it is the general purpose of this invention to provide an apparatus which will plant seeds in an orderly array in the above specified packs, the planting being done with a minimum of labor and on a semiautomatic or automatic basis.

Among the several provisions and objects of the invention, may be noted the following:

One object of the invention is the provision of an automatic or semi-automatic seed planter capable of planting a plurality of seeds in an orderly array over an area.

Another object of the invention is the provision of apparatus of the above kind in which air means are used first to pick up seeds from a tray, and then discharge the seeds in their proper locations above an area to be seeded.

A further object of the invention is the provision of a seed planter of either of the above kinds, in which additional mechanical means are used to assist in preventing the seeds from sticking to the ends of the suction means used, so that seeds will always be discharged from the latter.

Yet another object of the invention is the provision of apparatus of the last kind in which the mechanical means to assist in discharging the seeds is combined with additional means for causing air to flow outwardly from the seed holding means, the combination being effective to discharge the seeds positively.

A still further object of the invention is the provision of a seed planter of the last named kind, in which the mechanical assist means is a porous means having a smooth surface to which seeds will not stick.

Other objects and advantages of the invention will be in part obvious and in part pointed out hereinafter.

Accordingly, the invention comprises the elements and combinations of elements, features of construction, arrangements of parts which will be exemplified in the structures hereinafter described, and the scope of the application of which will be indicated in the appended claims.

In the accompanying drawings, in which two of the various possible embodiments of the invention are illustrated:

Similar reference characters indicate corresponding parts throughout the several views of the drawings, and dimensions of certain of the parts as shown in the drawings may have been modified and/or exaggerated for the purposes of clarity of illustration and understanding of the invention.

Figure 1:
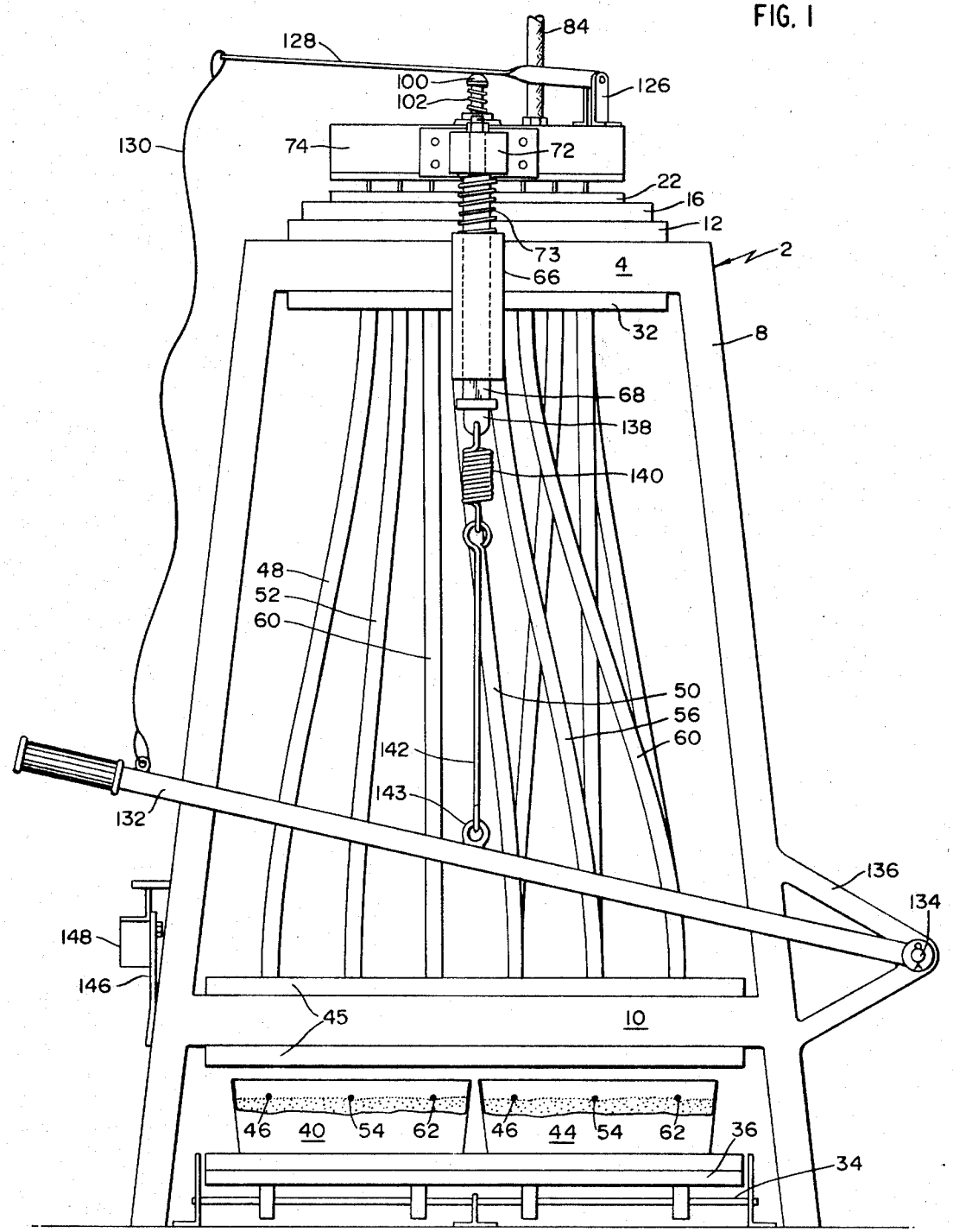
FIG. 1 is a side elevation of a preferred embodiment of the invention.

Referring now to FIG. 1, a stand 2 is shown, comprising rectangular top frame 4 made of strips of angle iron welded or otherwise fastened at their corners (see FIG. 2), the frame having an open central portion 6. Frame 4 is supported by four legs 8, these legs also being constructed of angle iron and being reinforced by the cross rails 10 as shown. The rails 10 are so positioned as to provide a space below them for a purpose later to be described.

Fastened to the frame 4 is the platform 12 to which are fastened stop members 14 and 16 extending across the platform. Between these two stop members extend spaced-apart guide rails 18. (In FIG. 2, one of these guide rails is shown, and it will be understood that a similar guide rail exists on the other side of platform 12 spaced from the rail 18.)

Slidable on the platform 12 between guide rails 18 and between the stop members 14 and 16 is seed-carrying tray 22. The seed tray occupies two terminal positions and in FIG. 2, the tray 22 is shown in full lines in one position in which seeds may be taken therefrom. Also, in FIG. 2, the other terminal position is shown (dotted lines 24), the terminal positions being determined by stop members 14 and 17. A convenient handle 26 is provided for grasping the seed tray and moving it, although it will be understood that while a manual means for moving the tray is shown in this embodiment, the basic structure could be adapted for automatically moving the seed tray by properly designed machinery.

Figure 2:
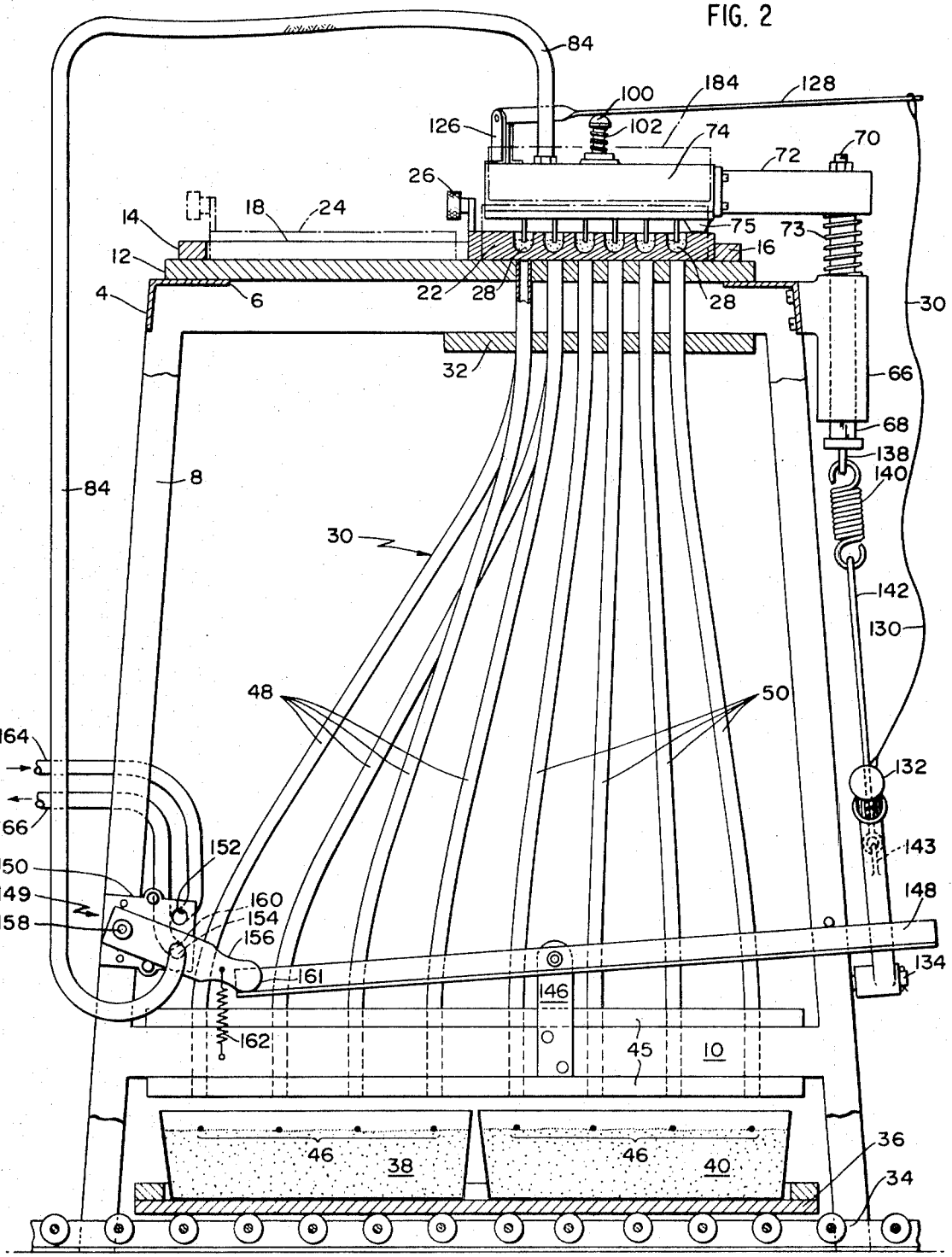
FIG. 2 is a front elevation of the FIG. 1 embodiment, partly in section.

Seed tray 22 is provided with a plurality of recesses 28 which are adapted to hold the seeds which are to be planted by the apparatus. Recesses 28 are arranged in a predetermined order or array, and correspond in number to the total number of locations in which it is desired to plant the seeds in a plurality of packs at one time. Therefore, for the purpose of illustration, assume that in a given pack, the array of seed locations will comprise three spaced-apart rows with each row containing four spaced-apart seeds. As explained later, four packs are to be planted simultaneously, so there will be a total of 48 seed locations. Consequently, there will be 48 recesses in the seed-tray 22. FIG. 2 shows six recesses in a row, and there are eight such rows.

Each recess of tray 22 is adapted to hold a number of seeds to be planted, and by localizing the seeds in this manner, it makes it possible for each of the seed transfer suction needles always to have a supply of seeds. This compares to a single open tray on the bottom of which the seeds can move about freely. In such a case, a given suction needle can at times locate at a spot where there are no seeds.

A plurality of guide tubes 30 made of synthetic plastic material (or other convenient tubing such as aluminum) are provided, whose upper ends are mounted by convenient means in suitable holes in the platform 12. Further support is given by a lower plate 32 which is fastened beneath the rails 4 forming the top of the stand. One such guide tube is provided for each recess and underlies the recess when the tray is in the position shown in FIG. 2, and thus there are 48 such guide tubes and at their upper ends they are in the same array dimensionally and geometrically as the recesses 28.

Referring now to FIG. 2, at the base of the stand is mounted a roller or ball conveyor 34 on which can slide a pack-carrying tray 36. The tray 36 is just large enough to carry four packs 38, 40, 42 (not shown) and 44. The packs are positioned and held on tray 36 by suitable side and end rails so as to be in close proximity to each other, preferably with their inner upper rims touching. When the tray 36 and its four packs are underneath the apparatus as shown in FIGS. 1 and 2, it will be noted that the packs themselves occupy most of the area covered by the base of the apparatus.

Mounted on the cross rails 10 are a pair of guide plates 46 which serve to hold the lower ends of the guide tubes 30 in such array that each open tube end overlies one of the spots in a pack where a seed is to be deposited. The tube layer ends are spaced apart a distance greater than the upper ends, because of the greater overall area to be covered. Thus, the bottom ends of the tubes are so arranged in the guide plates 46 that the tubes provide, for each pack, three rows 46 of seed deposit places extending the length of the pack with each row having four seed deposit places. (Thus there are four rows extending cross-wise of the pack). Therefore, on the surface of the growing material in each pack, there are provided 12 spots at which seeds will be deposited by the respective 12 tubes which overlie the spots.

As an example of this, and referring to FIGS. 1 and 2, in FIG. 1, four tubes numbered 48 have their tops underlying four recesses in tray 22 and extend from the top of the apparatus down to the bottom. The bottom ends are arranged to drop their seeds along the first row 46 of pack 40 as shown. Similarly, four tubes 50 will extend from the top of the apparatus, and will be arranged so that they drop their seeds along the first row 46 of pack 44. In like manner, four tubes 52 extend downwardly to drop their seeds to form the second row 54 of pack 40, and the tubes 56 are arranged at the bottom end so as to drop seeds along the second row 54 of pack 44. In similar manner, seeds are dropped by the tubes 60 to form the third row 62 of packs 40 and 44. So also, the other tubes will be arranged so that their bottoms drop seeds to form the correct rows in packs 38 and 42.

It will be noted that it is the ordered array of the bottom ends of the tubes that determine where seeds will be deposited. Each top end can underlie any one of the recesses 28 without changing the array in which seeds are deposited. However, in order to avoid having to bend the tubes 30 too much, it is preferable to have the tubes dropping seeds in a given row and pack, originate below those recesses in tray 22 whose positions and array bear some likeness to the array of the lower ends of the tubes.

From this general description, it will be seen that each time seeds are dropped down the tubes 30, four packs 38, 40, 42 and 44 will be planted with seeds in an orderly array, and, in the exemplary embodiment shown the seeds will be planted at 12 discrete spots on the surface of the culture material in each pack.

Attached to the side of the framework is a guide sleeve 66 through which slidably moves an actuating shaft 68. Mounted by means of a threaded extension and nut 70 at the end of the shaft is an arm 72 which is attached to a suction box 74. Between the arm 72 and the top of the sleeve 66 is provided the compression spring 73 whose function is to bias the arm 72 and thus the suction box into its uppermost position.

In order to prevent the suction box from moving down too close to the seed-carrying tray 22, a stop member 75 is provided. The suction box is large enough to overlie completely the seed-carrying tray 22 when the latter is underneath the former, in its terminal position.

Figure 3:
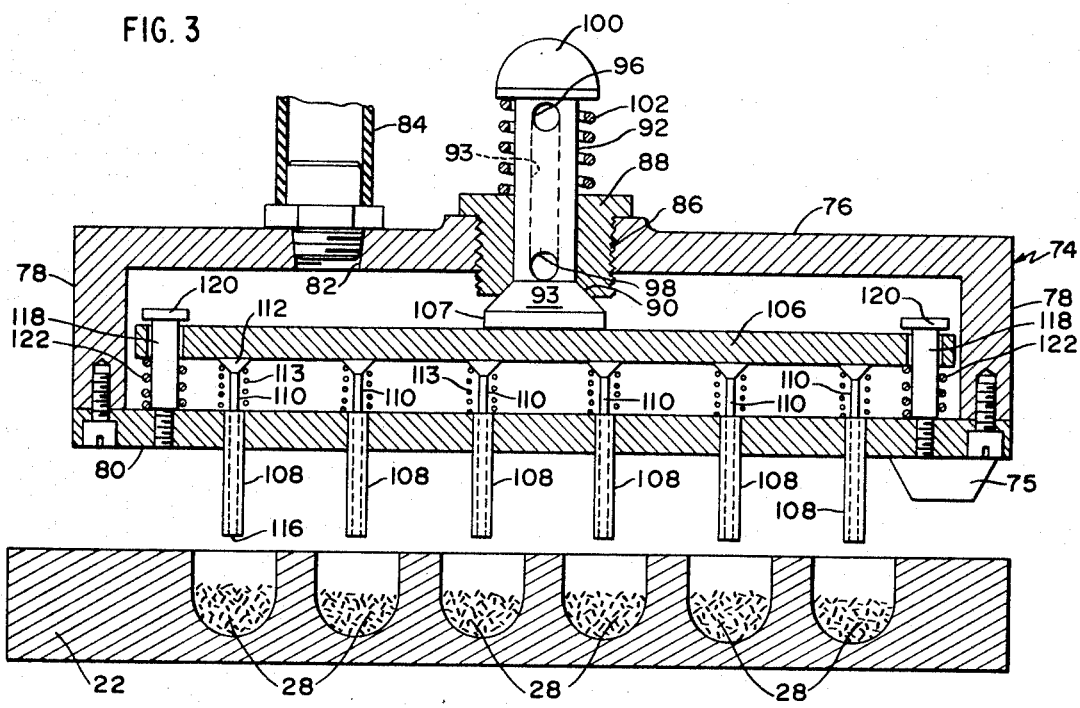
FIG. 3 is a cross-sectional elevation of a portion of the FIG. 1 embodiment, given to show in greater detail the interior construction of a portion of the seed transfer mechanism.

Referring to FIG. 3, an enlarged section view (compared to the other drawings) of the suction box is shown. It comprises a shallow box-like structure having a top 76 and the sides 78. It is hermetically closed by a bottom 80. The bottom 80 may be attached by conventional means (such as the screws shown) to the rim of side walls 78 with appropriate gasket or other sealing means.

The top 76 is provided with an opening 82 into which may be attached conventionally an air hose 84. Another hole 86 provided into which is screwed the valve supporting sleeve 88, the latter being provided at its inner end with the valve seat 90. Slidable in the valve 88 is the valve piston 92 having a valve face 93 engageable with seat 90, and which is also provided a bore 94 in the interior thereof, the bore being provided with radial orifices 96 and 98 at each end thereof. A rounded head 100 is provided at the upper end of the valve piston 92, and a spring 102 is provided to bias the piston outwardly so that the piston closes off the valve 90, 93.

In operation, when the valve piston 92 is moved downwardly (as viewed in FIG. 3), air is permitted to enter the interior of the suction box 74 via the orifice 96, bore 94 and orifice 98. When the valve plunger is in the position shown in FIG. 3, air cannot enter the box.

Within the suction box 74 is provided a thrust plate 106 which bears against and is actuated by the enlarged end 107 of the piston 92. Thus, as the piston 92 moves down, the plate 106 is moved down thereby. The plate is guided by posts 118 screwed into plate 80, and springs 122 serve to bias plate 106 upwardly. Thus, when piston 92 moves upwardly, plate 106 moves upwardly with it. Posts 118 are provided with heads 120 to prevent the plate 106 from moving too far upwardly.

Figure 4:
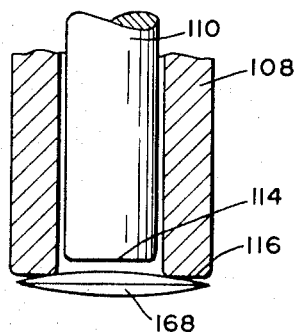
FIG. 4 is a cross-section of a portion of one of the suction needles of the FIG. 1 embodiment, showing in enlarged manner certain details of construction.

Attached to the closing plate 80 of suction box are a plurality of suction needles 108 these matching, in number and ordered array, the recesses 28 in the seat-carrying tray 22. The attachment of the needles 108 to the plate 80 is by conventional means such as soldering or welding, and must be done so that the hole in each needle communicates with the interior of box 76. A plurality of pins or plungers 110 is provided which fit in the hold of each needle. There is one for each needle 108, and each pin fits loosely but with a predetermined clearance between the circumference of the pin and the inner diameter of the needle hole. Each pin is provided with a head 112 which engages the under surface of the plate 106 so that actuation of the latter will move the pins in an up and down direction in the needles. Each of the pins 110 is biased upwardly by a spring 113, and it will be noted by reference to FIG. 3, and also to FIG. 4, that when the plate 106 is in its uppermost direction, the lower end 114 of each pin is just slightly above the end 116 of the suction needles 108.

As pointed out above, the number and arrangement of the suction needles 108 correspond to the number and arrangement of the recesses 28 in the seed-carrying plate 22 and are aligned therewith. Thus such suction needle overlies the upper end of one of the tubes 30.

The adjustment of plate 106 with respect to plunger 92 is such that when plunger 92 has been moved up far enough downwardly to expose the orifice 98 below the valve seat 90, then the pins 110 will extend just slightly beyond the ends of the suction needles 108.

In regard to the difference between the diameter of the pins 110 and the interior diameter of the needles 108, and as to the position of the lower end of a push pin with respect to its needle, the following may be noted:

It has been mentioned above that when the plate 106 is in its uppermost position, the end of the pins 110 are just slightly above the end of the needles 108. Actually, depending upon the length, shape and diameter of the seed being picked up by the suction needles 108, this difference can vary from one-sixteenth of an inch to one-eighth of an inch. In view of the rather large variation in size and shape of individual seeds, no dimension suitable for all seeds can be given herein. The figures given will be suitable for most seeds.

As to the clearance between pin and needle, when the interior diameter of the suction needle 108 is approximately equal to 0.033 inches, the outside diameter of the pins 110 should be approximately 0.031 inches. That is, for a light or small seed, the separation or gap between the outer diameter of the pin and the interior diameter of the needle should be approximately 0.001 inches. For a heavier seed such as a dahlia, this separation is preferably about 0.005 inches or thereabout. In such case, the interior diameter of the needle can be, for example, 0.065 inches, and the pin diameter can be 0.055 inches, both dimensions being approximate.

Attached to the top of the suction box 74 is a support clevis 126 to which an actuating lever 128 is attached by a pivot, the rod extending across the suction box so as to overlie the rounded top 100 of the valve plunger 92. At the outer end of the actuating rod 128 is attached a pull rod or cable 130, the lower end of which is attached to one end of a lever 132. The other end of the latter is pivoted conventionally by a pivot 134 supported in the bracket 136 which is attached to one leg of the framework.

One end of the shaft 68 is provided with an eye loop 138 at which is attached one end of spring 140, the other end of which is attached to a pull-rod 142 whose lower end is fastened to lever 132 by an eye 143. Thus, actuation of the lever 132 will pull the shaft 68 in a downward direction to move the plunger 92 downwardly against the resistance of the bias spring 102 and at the same time move the suction box downwardly. When the suction box stops and plunger 92 is fully depressed, the spring 140 will elongate it to provide a necessary lost motion to permit the lever 132 to be moved further downwardly.

Pivotally attached to a bracket 146, which in turn is attached to a cross rail 10, is a lever 148 one end 150 thereof being in such position as to be actuated by the end of lever 132 when the latter is moved to its further position downwardly.

Mounted on one leg of the structure is a slide-valve structure indicated generally by the numeral 149 comprising a valve plate 150 having the two orifices or ports 152 and 154. A sliding valve plate 156 is pivotally attached by a pivot 158 to the plate 150, and has a port 160 which is adapted to align with each of the ports 152 or 154 depending upon which of its two positions the plate 156 is in. The plate can occupy a lower position (illustrated in FIG. 2) or an upper position (not shown) by being swung about pivot 158. In its lower position, port 160 aligns with port 154. The other end 161 of lever 148 underlies an extension of valve plate 156, so that tilting of lever 148 will actuate plate 156. A spring 162 biases plate 162 into its downward position.

The lever 132 is arranged so that in its furthermost downward position, it strikes the end of the lever 148 and pivots this to raise end 161 of the lever. This pivots plate 156 to its upper position so that port 160 will align with stationary port 152. Upon a return of the lever 132 to the upper position indicated in FIG. 1, the lever 148 is released, and the spring 162 rotates valve plate 156 to its lower position to align ports 160 and 154, and this also rotates the lever 148 counterclockwise to the uppermost position shown in FIG. 2.

Attached to the port 160 is one end of the flexible suction tubing 84 which leads to the orifice 82 in the suction box 76.

Attached to the ports 152 and 154 are respectively air conducting hoses 164 and 166. Hose 164 leads to a positive pressure air supply device, and hose 166 leads to an air suction device. Conveniently, hose 166 can be connected to the air inlet side of an air blower, and hose 164 can be connected to the outlet of the same device. One end of hose 84 is connected to port 160.

Therefore, when the lever 156 is in the position shown in FIG. 2 with ports 160 and 154 aligned, air is sucked through the hose 84 and thus through the suction box 74 via the suction needles 108; when valve plate 156 is in its upper position with ports 160 and 152 aligned, air is blown into the suction box and thus outwardly through the needles 108.

The operation of the device is as follows: Referring to FIG. 2, and assuming that the seed tray 22 is in the dotted line position 24 and the suction box is in its upper position indicated by dotted line 184, seeds are placed in each of the recesses 28, and the tray is manually moved to the full line position shown in FIG. 2. (The air suction and blowing device is assumed to be operating.) The hand lever 132 is then moved downwardly with the result that the pull rod 142 via the tension spring 140 pulls the shaft 68 downwardly which in turn moves the arm 72 and the suction box downwardly to the FIG. 2 full line position. In this position, the ends of the suction needles 108 will have entered the recesses 28 to be in the midst of the seeds therein. At this point, lever 148 and valve plate 156 are in the positions shown in full lines in FIG. 2, with the result that air is being sucked through the tube 84, the suction box 84 and the needles 108. As a result, to the end of each needle there is attracted and held one or more seeds 168. At this point, lever 132 has not been pulled far enough down to actuate plunger 92.

The handle 132 is released, thus allowing the shaft 68, the arm 72 and the suction box 74 to rise to the upper position thus withdrawing the seed or seeds which are held to the end of the needles. This frees the tray 22, which is then moved to the left to the dotted line position 24 and out of the way of the suction box. This also exposes the upper ends of the tubes 30. Again the lever 132 is moved down to move the suction box far enough down so that each needle enters its respective open end of tubes 30 preparatory to discharging the seeds into these tubes. This further motion of the suction box is permitted because the stop 75 no longer has the seed tray as an abutment. However, the stop 75 is effective to stop further motion of the suction box when the ends of the needles have entered the upper ends of tubes 30. At this point, the lever arm 132 is further moved downwardly, with the result that the cable 130 pulls the lever 128 downwardly to depress plunger 92 and thus expose the orifice 98 to the interior of the suction box. This permits the entrance of air into the suction box, thus releving any vacuum that previously existed therein.

At the same time, the lever 132 strikes the end of the lever 148, rotating it about its pivot point in bracket 146 to as to pivot valve plate 156 to its upper position so that port 160 aligns with port 152. Air is then blown via hoses 164 and 84, into the suction box, and out through the needles 108 via the clearance between the pins 110 and the walls of the needles. Depression of plunger 92 simultaneously moves plate 106 downwardly which in turn moves the push pins 110 downwardly. The combination of the air flowing outwardly through the needles and the mechanical action of the pins thrusting against the seeds effects a sure and positive discharge of the seed or seeds from the end of each needle.

Thereafter, the lever 132 is released, which in turn permits the counter-clockwise rotation of the lever 148 and the return of the valve lever 156 to the air suction position shown in full lines in FIG. 2. At the same time, the shaft 68 is permitted to rise upwardly carrying with it the suction box 74 in order to move it and the needles to their uppermost position. This exposes the space underneath the needles so that the seed carrying tray 22 may again be moved from its dotted line position 24 to the position underneath the needles. The planted packs are slid out from beneath the apparatus, four new packs are moved in place, and the above planting cycle is repeated.

As the seeds are discharged from the needles 108, each seed or seeds fall through its proper tubing and therefore falls onto the culture surface in the various packs in the predetermined orderly array.

Figure 5:
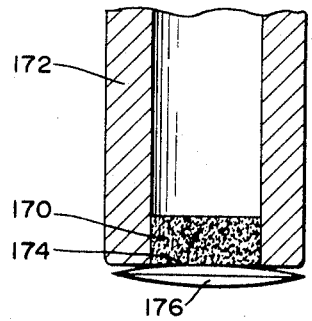
FIG. 5 is a view similar to FIG. 4, but showing in section a portion of a suction needle used in another embodiment of the invention.

A further embodiment is illustrated in FIG. 5, in which all of the structural features of the FIGS. 1, 2 and 3 embodiment are used, except that neither the thrust pins 110 of the first embodiment nor plate 106 are used. Instead, a porous plug 170 is either inserted (as shown in FIG. 5) into the end of the respective needles 172, or is formed as part of a cap which may be placed over the end of the needle. The porous plug 170 is made of a sintered material, so as to permit the passage of air therethrough in both directions. It is essential that the outer surface 174 of the plug shall be smooth. Thus, when the needle 172 is inserted into the recesses 28, and air is drawn therethrough, a seed 176 will be drawn up against the end of the needle and the smooth surface of plug 170, to be held there until the direction of air flow is reversed. Because of the smoothness of the outer surface 174 of plug 170, the seed will be completely discharged from the end of the suction needle since the smooth surface of the plug will prevent any roughness of the surface of the seed from adhering to the end of the needle.

The operation of the embodiment shown in FIG. 5 is similar to operation of the first embodiment.

If desired for both embodiments, a complete assembly of cover plate 80 and needles 108 or 172 may be made up for each particular kind of seed. On the other hand, if desired, the needles 108 may be fastened to plate 80 by suitable detachable engagement such as a threaded attachment, and for a particular kind of seed the needles for that seed may be individually substituted for previous needles.

Not all of the recesses 28 need be used. If desired, seeds may be placed in only a number of recesses and in a predetermined array, and thus since only seeds from those recesses will be picked up by the needles, the number and array of planting spots on the packs will be different from what is described above.

From the above, it can readily be noted how rapid the operation of seeding the packs is, how accurately the seeds may be placed, and how versatile the apparatus is as to kind of seed and planting arrays obtainable.

It is also to be noted that by varying the size of the needles themselves, in relationship to the size and shape of the seeds, by the instant invention it is possible to arrange to pick up only one seed or as many as three seeds with each needle. The reason for this being a desired factor is that, depending on the germination factor of the seeds, it may be more advantageous to plant three seeds in one place on the pack instead of one seed. In order to pick up a plurality of seeds, it is necessary to increase the gap or clearance between the needle and the pin in order to suck more air up through the needle. If this is done, again it becomes important that the thrust rod or pin be used to assist in properly ejecting a plurality of seeds from the ends of the needle, and also to prevent these seeds from entering into the end of the needle and thus plugging it. Or, the porous plug 170 may be used.

As an emphasis as to the size of the operation involved in planting such packs, it is to be noted that for the small horticulturist or flower growers 40,000 packs per year need to be planted. For the larger units, up to and over 1,000,000 packs per year must be planted. By the use of the instant invention, as compared to hand transplanting as earlier described in this application, labor costs can be reduced to at least one third.

In view of the above it will be seen that the several objects of the invention are achieved and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

Having described the invention, what is claimed is:

1. Apparatus for planting seeds comprising a base; a seed-carrying tray on the base and having a plurality of recesses therein to carry seeds; a hollow suction box mounted on the base, the seed-carrying tray and suction box being positionable with respect to each other in two positions, in the first position the suction box being over the seed tray, and in the second position the suction box and seed tray being laterally displaced from one another; a plurality of hollow suction needles fastened to and extending downwardly from the suction box, the needles and recesses being in the same ordered array and equal in number, the needles being centered over the recesses when the suction box is over the tray, the upper ends of the needles opening into the suction box and the lower ends of the needles being adapted to enter said recesses when the suction box is in the first position; means for sucking air through said needles and into said box thereby to attach and hold temporarily a seed at the lower end of each of the needles; means for blowing air out of said box through the needles to discharge the seeds from the needles; mechanical means for assisting the seeds to become discharged from the needles; and valve means for first causing a suction in the box to cause air to flow into the box through said needles, and thereafter reversing the flow of air to cause it to flow out of the box through the needles.

2. The apparatus of claim 1 including a plurality of hoses having upper and lower ends, said hoses extending from the top of said base downwardly to a position above the bottom of said base, the upper ends of each of said hoses underlying said needles, and the lower ends of the hoses being a sufficient distance above the bottom of the base to permit the positioning of at least one pack below said lower ends, the upper ends of the hoses being in the same ordered array as said recesses and said needles, and each needle being centered over the upper end of a single hose.

3. The apparatus of claim 2 including mounting means adapted to move the suction box upwardly and downwardly from an upper position to a lower position and vice-versa, the suction box with its needles when in the upper position being high enough above the top of said base to permit the introduction therebelow of said seed carrying tray, and the suction box when in its lower position being positioned so that each of said needles enters into the upper end of a corresponding hose.

4. Apparatus of claim 3 including a lever for moving said suction box in an up and down direction, and also for moving said valve, the apparatus including an air suction and air blowing means, and a valve mounted so as to be actuated by said lever from a first position to a second position, the valve being in its second position when the suction box is in its lower position to channel air from the air blower into the box and out through said needles, and the valve being in its first position when the suction box is in its upper position to channel air through said needles into said box and to said suction means.

5. The apparatus of claim 1 in which the mechanical means for assisting the seeds to become discharged from the needle comprises a pin slidable within the bore of each needle, the pin being adapted to be moved along the length of the needle sufficiently so that one end of the pin projects below the outer end of the needle at the time that air is being blown through the needle, the pin being adapted to be retracted into the needle so that the said one end is slightly within the needle.

6. Apparatus of claim 5 including a thrust plate movably mounted within the interior of the suction box, and actuable to move each push pin downwardly to thrust a seed from the end of its respective needle; the suction box having an inlet, a valve operable when in one position to close said inlet, and when in another position to open said inlet; and means for actuating said valve when the suction box and its needles are in their lower position to permit entrance of air into the suction box.

7. The apparatus of claim 2 including stop means mounted on the suction box to abut against the seed-carrying tray when the latter is below the suction box, thus limiting the down-ward motion of the suction box; said stop being adapted to butt against the top of the base when the seed-carrying tray and suction box are displaced away from each other, thereby permitting the suction box to move down to position in which each of said needles projects into the top end of each of said hoses.

8. The apparatus of claim 5 in which the diameters of the thrust pins are less than the diameter of the bore of said needles, thereby to provide an air gap between said thrust pins and the walls of said bore to permit the passage of air through the needle in both directions.

9. The apparatus of claim 8 in which the radial length of said air gap is within the range of 0.001 inches to 0.005 inches.

10. Apparatus for planting seeds comprising a base; a seed-carrying tray on the base and having at least one recess therein to carry seeds; a hollow suction box mounted on the base, the seed-carrying tray and suction box being positionable with respect to each other in two positions, in the first position the suction box being over the seed tray, and in the second position the suction box and seed tray being laterally displaced from one another; at least one hollow suction needle fastened to and extending downwardly from the suction box, the upper end of the needle opening into the suction box and the lower end of the needle being adapted to enter said recess when the suction box is in the first position; means for sucking air through said needle and into said box thereby to attach and hold temporarily a seed at the lower end of the needle; means for blowing air out of said box through the needle to discharge the seed from the needle; mechanical means for assisting the seed to become discharged from the needle, comprising a porous plug fitted to the lower end of the needle, the plug being porous enough to permit air to pass therethrough in both directions, the outer surface of said porous plug being sufficiently smooth as to hinder the inadvertent attachment thereto by the outer periphery of a seed; and valve means for first causing a suction in the box to cause air to flow into the box through said needle, and thereafter reversing the flow of air to cause it to flow out of the box through the needle.

* * * * *